United States Patent
Adhikari et al.

(10) Patent No.: US 7,602,728 B2
(45) Date of Patent: Oct. 13, 2009

(54) METHOD AND APPARATUS FOR DETERMINATION OF NETWORK TOPOLOGY

(75) Inventors: Akshay Adhikari, Bernardsville, NJ (US); Lorraine Denby, Berkeley Heights, NJ (US); Jean Meloche, Madison, NJ (US); Balaji Rao, Basking Ridge, NJ (US)

(73) Assignee: Avaya Inc., Basking Ridge, NJ (US)

( * ) Notice: Subject to any disclaimer, the term of this patent is extended or adjusted under 35 U.S.C. 154(b) by 1067 days.

(21) Appl. No.: 10/460,700

(22) Filed: Jun. 12, 2003

(65) Prior Publication Data

US 2004/0252694 A1    Dec. 16, 2004

(51) Int. Cl.
*H04L 1/14* (2006.01)

(52) U.S. Cl. ............... 370/248; 370/252; 370/392; 709/224

(58) Field of Classification Search ........... 370/520, 370/395.6, 395.1, 389, 351, 473, 474, 248, 370/251, 252, 253, 254, 471, 392; 709/223, 709/224, 225–232
See application file for complete search history.

(56) References Cited

U.S. PATENT DOCUMENTS

| | | | | |
|---|---|---|---|---|
| 2001/0050903 A1* | 12/2001 | Vanlint | | 370/252 |
| 2002/0091834 A1* | 7/2002 | Isozu et al. | | 709/227 |
| 2003/0023710 A1* | 1/2003 | Corlett et al. | | 709/223 |
| 2003/0051032 A1* | 3/2003 | Schenkel et al. | | 709/224 |
| 2003/0093244 A1* | 5/2003 | Corlett et al. | | 702/186 |
| 2003/0093563 A1* | 5/2003 | Young et al. | | 709/245 |
| 2003/0097438 A1* | 5/2003 | Bearden et al. | | 709/224 |
| 2004/0066780 A1* | 4/2004 | Shankar et al. | | 370/389 |
| 2004/0167977 A1* | 8/2004 | Douglas et al. | | 709/224 |
| 2004/0199627 A1* | 10/2004 | Frietsch | | 709/224 |
| 2004/0252694 A1* | 12/2004 | Adhikari et al. | | 370/395.2 |
| 2006/0262774 A1* | 11/2006 | Moldestad et al. | | 370/352 |

FOREIGN PATENT DOCUMENTS

| | | |
|---|---|---|
| CA | 2488401 A1 | 5/1997 |
| KR | 20030033709 A | 5/2003 |

OTHER PUBLICATIONS

Y. Breitbart et al., "Topology Discovery in Heterogeneous IP Networks," Proceedings of IEEE Infocom 2000, 10 pages, Mar. 2000.

(Continued)

*Primary Examiner*—Aung S Moe
*Assistant Examiner*—Habte Mered
(74) *Attorney, Agent, or Firm*—Ryan, Mason & Lewis, LLP

(57) ABSTRACT

Network topology information is determined in a network-based communication system by generating communications between, for example, selected pairs of endpoint devices each associated with a network. A given one of the communications is sent from a first one of the endpoint devices to a second one of the endpoint devices and returned from the second endpoint device to the first endpoint device. Information contained in the communication as received at the first endpoint device from the second endpoint device is processed to determine network topology information characterizing at least a portion of the network.

20 Claims, 4 Drawing Sheets

OTHER PUBLICATIONS

B. Huffaker et al., "Topology Discovery by Active Probing," CAIDA, 8 pages, 2002.

M.R. Meiss et al., "Standards-Based Discovery of Switched Ethernet Topology," Advanced Network Management Lab, pp. 1-20, Apr. 2002.

R. Siamwalla et al., "Discovering Internet Topology," Cornell University, pp. 1-16, Jul. 1998.

U.S. Appl. No. 10/261,431, filed Sep. 30, 2002, "Communication System Endpoint Device with Integrated Call Synthesis Capability."

"Omegon Unveils NetAlly Solution; Industry-First Fully Active Service Quality Assurance Platform Assures Customers Unprecedented Levels of Network Availability and Reliability," http://www.itsecurity.com/tecsnews/sep2000/sep517.htm, pp. 1-3, Sep. 2000.

"Chariot VoIP Assessor Version 1.0," http://www.tmcnet.com/it/0302/0302labs5.htm, pp. 1-4, Mar. 2002.

"VoIP Management and Network Testing," http://www.netiq.com/solutions/voip/default.asp, pp. 1-3, 2002.

"Chariot," http://www.netiq.com/products/chr/, pp. 1-2, 2002.

"VoIP Test Module for Chariot," http://ww.netiq.com/products/chr/voipmodule.asp, pp. 1-2, 2002.

Telchemy, Inc., "Monitoring Voice Quality in Voice Over IP Networks," 3 pages, 2001.

Telchemy, Inc., "Bringing Intelligence to Networks," http://www.telchemy.com/, pp. 1-5, 2001.

Viola Networks, "NetAlly® VoIP—VoIP Readiness Testing and Deployment," http://www.omegon.com/netally_voip.asp, pp. 1-4, 2002.

Moshe Sidi et al., "Converged Network Performance Verification and e-Support Using NetAlly®," Omegon Networks Ltd., pp. 1-13, Jun. 2001.

Moshe Sidi, "Reality-based VoIP Readiness Testing using NetAlly® VoIP," Viola Networks, pp. 1-10, Apr. 2002.

Moshe Sidi, "Readying Your Network for VoIP: Get it Right the First Time," Viola Networks, pp. 1-9, Apr. 2002.

J.Q. Walker, "A Handbook for Successful VoIP Deployment: Network Testing, QoS, and More," NetIQ Corporation, pp. 1-13, 2002.

"NetIQ Vivinet Diagnostics," http://www.netiq.com/products/vd/default.asp, pp. 1-2, 1993-2003.

"NetIQ—Checklist of VoIP Network Design Tips," NetIQ Corporation, 3 pages, 2002.

Brix Networks, "Library," http://www.brixnet.com/library/library_register.cfm, 1 page, 2003.

Suchita Varma, "CA Application No. 2469169 Office Action", Dec. 16, 2008, Publisher: CIPO, Published in: CA.

Suchita Varma, "CA Application No. 2,469,169 Office Action", Jun. 6, 2008, Publisher: CIPO, Published in: CA.

Han, Jeong-Sooil Et Al., "A Study on Management Information Gathering Technique Based on Network Topology", May 2001, pp. 720729, vol. 26, No. 5a, Publisher: Korea Institute Communication Sciences, abstract only in English.

Dae-Sung Kim, "KR Application No. 10-2004-0043156 Office Action Nov. 20, 2008", Publisher: KIPO, Published in: KR.

Dae-Sung Kim, "KR Application No. 10-2004-0043156 Office Action Jun. 24, 2008", Publisher: KIPO, Published in: KR.

* cited by examiner

FIG. 8

```
CLASS_LIST=list of all equivalence classes
IP_LIST=list of all router IP addresses known
INTERVAL=interval between successive attempts at merging for each IP address known, append a singleton class C, consisting of the address to
CLASS_LIST
do forever {
        for each class in class_list {
                for each ip in class {
                        send UDP packet to IP address ip, port 9999
                        wait for reply
                        if reply==ICMP_DESTINATION_UNREACHABLE(PORT
UNREACHABLE) {
                                replyfrom=IP address from which message as received
                                if ip!=replyfrom {
                                        if ip and replyfrom are in separate classes {
                                                merge the classes
                                                inform the other endpoints about this class
                                        }
                                }
                        }
                }
        }
        if no classes were merged in this attempt, increase interval
        sleep(interval)
}
```

METHOD AND APPARATUS FOR DETERMINATION OF NETWORK TOPOLOGY

RELATED APPLICATION(S)

The present application is related to U.S. patent application Ser. No. 10/459,948, filed concurrently herewith in the name of inventors A. Adhikari et al. and entitled "Distributed Monitoring and Analysis System for Network Traffic," the disclosure of which is incorporated by reference herein.

FIELD OF THE INVENTION

The invention relates generally to network-based communication systems, and more particularly to techniques for determining network topology in such systems.

BACKGROUND OF THE INVENTION

In many applications, it is desirable to determine an otherwise unknown current topology of a given network. For example, such topology information is useful in analyzing data traffic flows, assessing network security, and determining readiness for implementation of Voice over Internet Protocol (VoIP).

A conventional approach to determining network topology utilizes the well-known Simple Network Management Protocol (SNMP). Such an approach is based at least in part on analysis of information contained in routing tables. As a result, this approach generally provides only a theoretical view of the network topology, rather than an actual operational view based on data traffic flows, and thus suffers from a number of significant drawbacks. For example, the resultant topology information fails to indicate how frequently certain nodes of the network are used relative to other nodes. In addition, the conventional approach fails to provide information which may be used to determine the efficacy of any load balancing processes that may be implemented in the network. Moreover, the topology information generated by the conventional approach does not reflect any variation in the topology that may occur when different types of data traffic are present. Yet another drawback of the SNMP-based approach is that it generally requires knowledge of community strings or other types of passwords in order to query a device for SNMP information.

It is therefore apparent that a need exists in the art for improved techniques for determining network topology which address one or more of the above-noted disadvantages of the conventional SNMP-based approach.

SUMMARY OF THE INVENTION

The invention provides techniques for improved determination of network topology in a network-based communication system. More specifically, the invention in an illustrative embodiment provides operational topology information based on actual traffic flows, and is able to avoid the drawbacks associated with the conventional SNMP-based approach.

In accordance with one aspect of the invention, the network topology information is determined by generating communications between, for example, selected pairs of endpoint devices each associated with a network. A given one of the communications is sent from a first one of the endpoint devices to a second one of the endpoint devices and returned from the second endpoint device to the first endpoint device. Information contained in the communication as received at the first endpoint device from the second endpoint device is processed to determine network topology information characterizing at least a portion of the network. The characterized portion of the network may be, for example, the portion associated with one or more paths between the endpoint devices.

In an illustrative embodiment, the given communication comprises a packet that is transmitted with a record route option enabled, and with a designated value in a Time To Live (TTL) field thereof. The packet may comprise, by way of example, an Internet Protocol (IP) packet having encapsulated therein a Real-Time Transport Protocol (RTP) packet.

In accordance with another aspect of the invention, a merging algorithm is provided that when executed identifies in the network topology information addresses belonging to the same network element, and groups the identified addresses into an equivalence class. The merging algorithm thus forms a set of equivalence classes, including one class for each of a plurality of network elements of the network.

In accordance with a further aspect of the invention, the network topology information includes identification of any network element that is unable to enter its address into a record route space of a communication comprising a packet. A given network element that is unable to enter its address into a record route space of the packet may be identified by sending probes with incrementally increasing Time To Live (TTL) values to previously identified network elements along a path from one of the endpoints to the other endpoint.

Advantageously, the invention can be configured so as to provide operational network topology information that is not readily determinable utilizing the conventional techniques described above. For example, the network topology determination techniques of the invention can be utilized to obtain information that characterizes the effectiveness of a load balancing process, and such information can be used in adjusting the load balancing process to achieve improved performance. Another example application of the invention is in topology generation within a distributed monitoring and analysis system for network traffic.

BRIEF DESCRIPTION OF THE DRAWINGS

FIG. 8 shows example pseudocode for a merging algorithm in accordance with the invention.

DETAILED DESCRIPTION OF THE INVENTION

The invention will be illustrated below in conjunction with an exemplary network-based communication system comprising a plurality of endpoint devices associated with a network. It should be understood, however, that the invention is not limited to use with any particular type of communication system or configuration of endpoint devices or other system elements. For example, although particularly advantageous in flow-based real-time applications in which it is desirable to understand end-to-end behavior attributable to a network, the disclosed techniques may be more generally utilized in any communication application which can benefit from improved determination of network topology. The invention can thus be used with voice, video, multimedia or any other type of real-time or non-real-time network traffic.

The terms "endpoint" and "endpoint device" are used interchangeably herein and are intended to include an origination or destination device associated with a given communication in a network-based communication system.

It is to be appreciated that a given endpoint device therefore need not be a terminal device of the system, and may comprise an internal network element such as, for example, a gateway, a router, a switch, or any other type of non-terminal network element. A given pair of endpoint devices in the illustrative embodiment may be viewed generally as comprising the source and destination nodes of a particular communication path. An endpoint device may therefore be a device comprising or otherwise associated with any network node.

Figure 1:
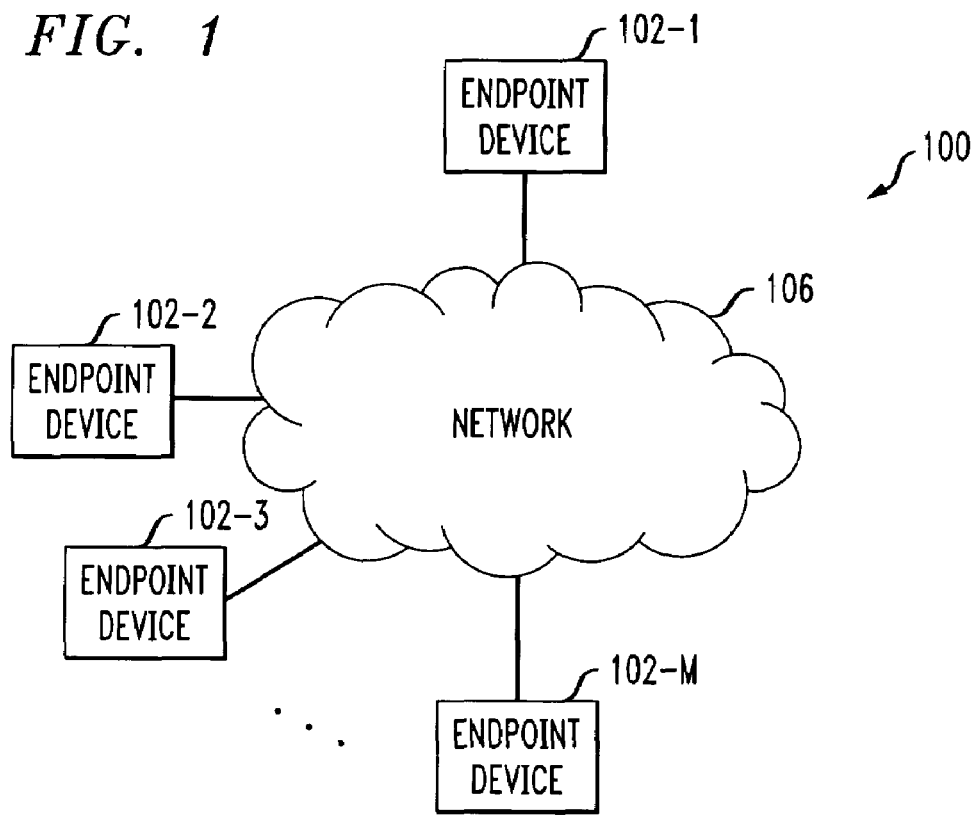
FIG. 1 shows an exemplary communication system in which the invention is implemented.

FIG. 1 shows an example network-based communication system 100 in which the present invention is implemented. The system 100 includes an arbitrary number M of endpoint devices 102-i, i=1, 2, . . . M, each of which is coupled to or otherwise associated with a network 106. The endpoint devices 102 are also referred to herein simply as "endpoints." Although shown for simplicity of illustration as terminal endpoint devices in the figure, one or more of the endpoint devices 102, as indicated previously, may comprise or be otherwise associated with an internal node of network 106.

An illustrative embodiment of the invention as implemented in the network-based communication system 100 of FIG. 1 provides network topology determination via the endpoints 102. In the illustrative embodiment, the endpoints 102 are each equipped with hardware, firmware and software elements that are used to provide the desired network topology determination functionality. The present invention in the illustrative embodiment provides operational topology information based on actual traffic flows, and avoids the drawbacks associated with the conventional SNMP-based approach.

Such network topology determination functionality may be used in a wide variety of applications. For example, the network topology determination techniques of the invention are useful in analyzing data traffic flows, assessing network security, and determining readiness for implementation of Voice over Internet Protocol (VoIP). As a more specific example, the invention can be used to obtain information that characterizes the effectiveness of a load balancing process in a network, and such information can be used in adjusting the load balancing process to achieve improved performance. Another specific example application of the invention is in topology generation within a distributed monitoring and analysis system for network traffic such as that described in the above-cited U.S. patent application entitled "Distributed Monitoring and Analysis System for Network Traffic."

In operation, the network topology determination functionality of the system 100 is configured such that communications are exchanged between the endpoints 102 in a manner that generates information characterizing the network topology, such as information identifying routers and paths between routers. The characterized portion of the network may be, for example, the portion associated with one or more paths between each of a plurality of selected pairs of endpoint devices.

The term "network topology information" as used herein is intended to include information specifying a set of paths and associated operational data traffic flows.

The terms "endpoint" and "endpoint device" as used herein are also intended to include a network node or any other processing device within or connectable to the network that is controllable to send test packets or other communications suitable for determining network topology information in the manner described herein.

The term "packet" as used herein is intended to include not only IP packets but also other types of packets, as well as packets that are encapsulated in other packets.

The endpoints 102 may be otherwise conventional wired or wireless IP telephones, personal digital assistants (PDAs), mobile telephones, personal computers (PCs), single-board computers (SBCs) or other types of processing devices, configured to support network topology determination in accordance with the invention.

It should be noted that the endpoints 102 are each typically configured to operate as both receiver and transmitter, as in the case of a bidirectional packet-based communication established between a given pair of endpoints.

Conventional aspects of such endpoints are well-known in the art and therefore not described in further detail herein.

It is assumed for simplicity of description that each of the endpoints 102 in the system 100 is configured to support the network topology determination functionality. Subsequent references to endpoints 102 herein should be understood to refer to endpoints that are so configured, unless otherwise noted. However, the system 100 can of course include numerous other endpoints that are not so configured but instead operate in an entirely conventional manner.

Additional system elements, not shown in FIG. 1, may be coupled between each of the endpoints 102 and the network 106.

Network 106 may represent, e.g., a global communication network such as the Internet, a wide area network, a metropolitan area network, a local area network, a wireless cellular network, a public switched telephone network (PSTN), or a satellite network, as well as portions or combinations of these or other communication networks.

The network 106 may comprise conventional IP routers, gateways, switches or other packet processing elements. For example, the network may include a DEFINITY® Enterprise Communication Service (ECS) communication system switch or a MultiVantage™ communication system switch, both available from Avaya Inc. of Basking Ridge, N.J., USA.

The illustrative embodiment may make use of a variety of standard communication protocols. These include, by way of example, User Datagram Protocol (UDP), described in Internet Engineering Task Force (IETF) Request for Comments (RFC) 768, "User Datagram Protocol," August 1980, http://www.ietforg/rfc/rfc768.txt, Real-Time Transport Protocol (RTP), described in IETF RFC 1889, "RTP: A Transport Protocol for Real-Time Applications," http://www.ietf.org/rfc/rfc1889.txt, and RTP Control Protocol (RTCP), described in IETF RFC 3158, "RTP Testing Strategies," August 2001, all of which are hereby incorporated by reference herein.

As a more specific example, communications between the endpoints 102 may comprise RTP packets that are sent over an IP network using UDP. The RTP packets may be encapsulated in UDP packets which are themselves encapsulated in IP packets, as will be described in greater detail below.

It should be emphasized that the simplified configuration of the system 100 as shown in FIG. 1 is for purposes of illustration only, and should not be construed as limiting the invention to any particular arrangement of elements. For example, the system 100 may include additional endpoints, and may utilize other types and arrangements of routing elements, switching elements or other types of processing elements.

Figure 2:
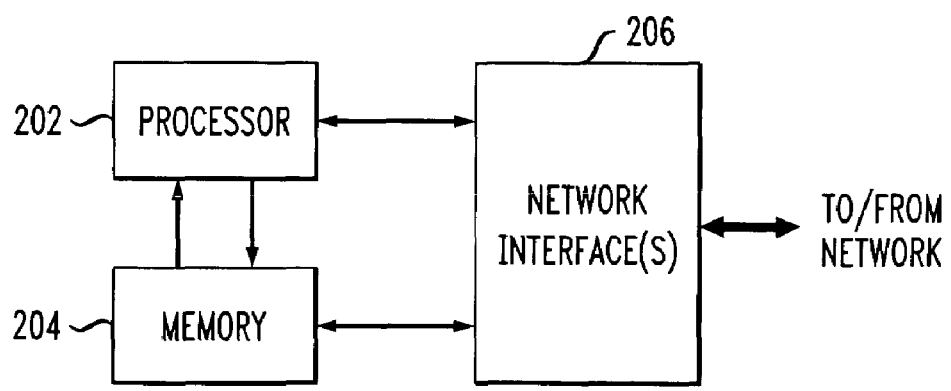
FIG. 2 is a simplified block diagram showing one possible implementation of an endpoint device or other processing element of the FIG. 1 system.

FIG. 2 shows one possible implementation of a given processing element 200 of the FIG. 1 system. The processing element 200 may represent, by way of example, at least a portion of one of the endpoint devices 102.

The processing element 200 as shown in the figure includes a processor 202 coupled to a memory 204 and one or more network interfaces 206. The network topology determination techniques of the present invention may be implemented at least in part in the form of software storable in the memory 204 and executable by the processor 202. The memory 204 may represent random access memory (RAM), read-only memory (ROM), optical or magnetic disk-based storage, or other storage elements, as well as combinations thereof.

Those skilled in the art will recognize that the individual elements of FIG. 2 as shown for illustrative purposes may be combined into or distributed across one or more processing devices, e.g., a microprocessor, an application-specific integrated circuit (ASIC), a computer or other device(s).

The FIG. 2 arrangement is considerably simplified for purposes of illustration. For example, if viewed as representative of a telephony terminal endpoint device, the processing element 200 may include conventional elements typically associated with such a device, such as codecs and other voice signal processing hardware or software elements.

Aspects of the invention relating to network topology determination will now be described in greater detail with reference to FIGS. 3 through 9. These aspects include discovering network nodes and edges using an approach based on use of the Time To Live (TTL) field and record route option of the IP standard.

Whenever an IP packet is transmitted on a network such as network 106, the TTL field is set on the packet. The TTL field as currently specified in the IP standard is a non-negative value less than 255. As the packet is routed within the network, every IP-compliant router reduces the TTL by one if the TTL is greater than or equal to one, prior to forwarding the packet. Also, any such router will discard a packet that is received having a TTL of zero. This process ensures that packets have a finite lifetime on the network and cannot be routed back and forth indefinitely.

Furthermore, when the record route option is enabled in the IP header of a given packet, each router along the path writes the address of its outgoing interface in the options field of the IP header. The options field is also referred to as the record route space of the IP header. Version 4 of the IP standard (IPv4) specifies that the record route space of the IP header can hold a maximum of nine IP addresses, although this restriction has been relaxed in subsequent versions, such as IPv6. It should be noted that the present invention does not require the use of any particular communication protocol or version thereof.

The addresses written into the options field in effect trace a path from a source endpoint to a destination endpoint for the given packet. Thus, when several of the endpoints 102 in system 100 communicate with each other, they can collectively discover a set of nodes and edges comprising the operational topology of the network. The nodes may correspond to routers, and the edges may correspond to the paths between the routers.

If configured in a conventional manner, the endpoints 102 would generally write their own IP addresses into the record route space. By way of contrast, in the illustrative embodiment of the invention, the endpoints 102 are preferably configured via a kernel modification or other suitable mechanism such that they are prevented from inserting their own IP addresses into the record route space.

Figure 3:
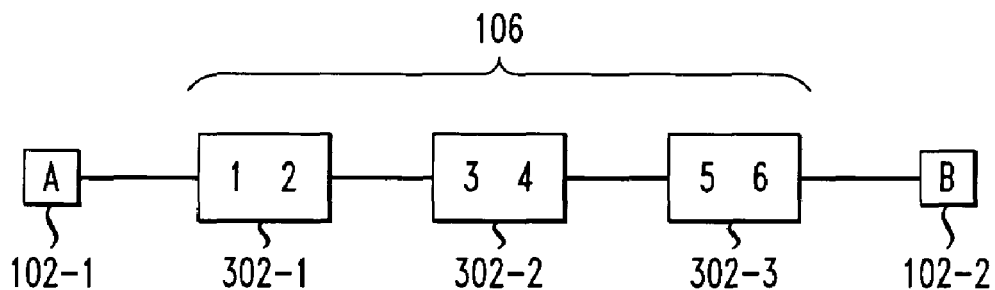
FIGS. 3 and 4 show an example network path and associated record route information.

Referring now to FIG. 3, an example is shown in which endpoints 102-1 and 102-2 communicate via routers 302-1, 302-2 and 302-3 of the network 106. The endpoints 102-1 and 102-2 are also denoted as endpoints A and B, respectively. The routers 302-1, 302-2 and 302-3 have input and output IP address pairs denoted $\{1, 2\}$, $\{3, 4\}$ and $\{5, 6\}$, respectively.

Figure 4:
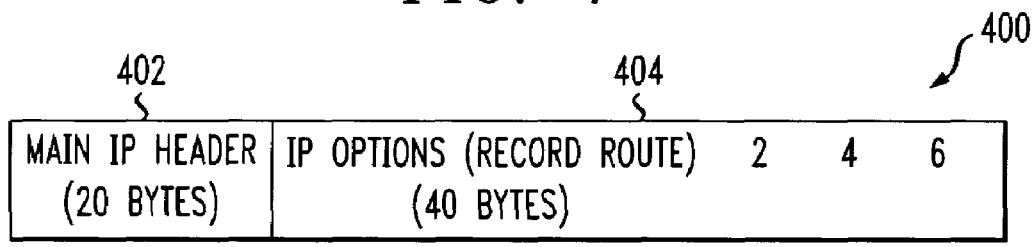

FIG. 4 shows an IP header 400 that includes the record route space for a given packet sent from endpoint A to endpoint B via the routers 302-1, 302-2 and 302-3. The IP header in this example includes a main IP header portion 402 that is 20 bytes in length, and an IP options portion 404 that is 40 bytes in length. As is apparent from the figure, the record route space in the IP options portion of the IP header includes the output IP addresses 2, 4 and 6. Also, the TTL field of the packet would be decremented by three in passing from endpoint A to endpoint B via the three routers.

It will be assumed for illustrative purposes that endpoints A and B exchange RTP packets that are encapsulated in UDP packets which are themselves encapsulated in IP packets, as indicated previously. More specifically, endpoint A sends an encapsulated RTP packet to endpoint B, which "echoes" the packet back to endpoint A. This is an example of what is more generally referred to herein as a communication being sent from endpoint A to endpoint B and returned from endpoint B to endpoint A. A "returned" communication may comprise one or more echoed packets as in the illustrative embodiment, or any other type of modified or unmodified version of a received communication, including an acknowledgement or other response message having a format different than that of the corresponding received communication.

Figure 5:
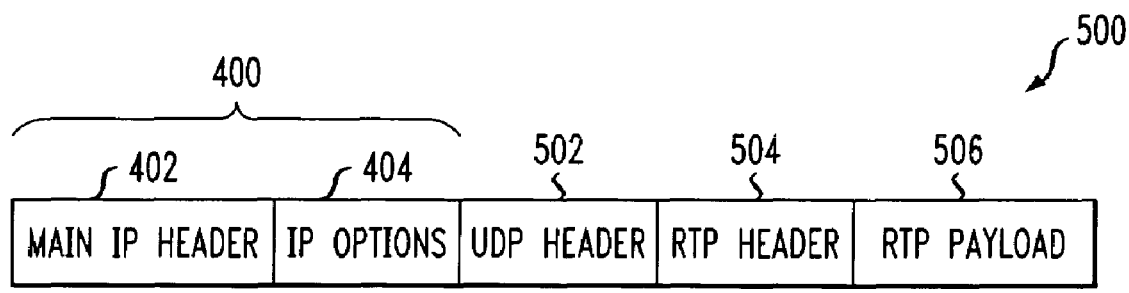
FIG. 5 shows an example IP packet format in an illustrative embodiment of the invention.

FIG. 5 shows the format of an example IP packet 500 in an illustrative embodiment of the invention, showing the encapsulation referred to above for the IP packets communicated between endpoints A and B. The IP packet 500 as shown includes the IP header 400 with portions 402 and 404 previously described in conjunction with FIG. 4, as well as a UDP header 502, an RTP header 504, and an RTP payload 506.

Figure 6:
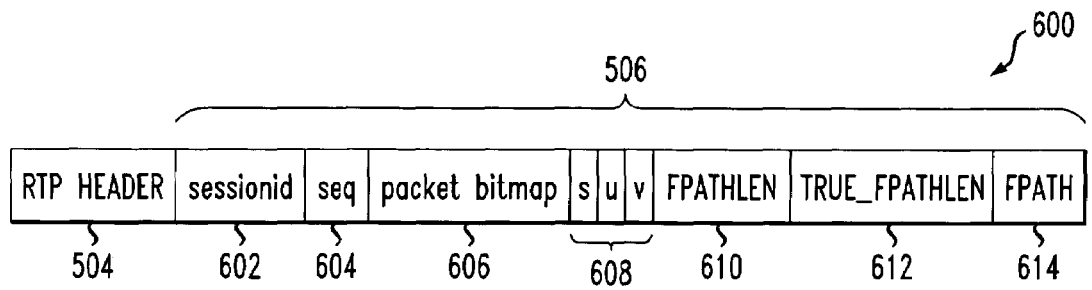
FIG. 6 shows an example packet format for an RTP packet encapsulated into the IP packet of FIG. 5.

FIG. 6 shows the format of an RTP packet 600 including RTP header 504 and RTP payload 506. The RTP packet as shown may be viewed as representative of a packet of the type that will be echoed back to endpoint A from endpoint B. The notation "F" in the labels of various fields generally denotes "forward path," and the corresponding fields carry information regarding the forward path from endpoint A to endpoint B, as extracted from the IP header of the corresponding packet sent from endpoint A to endpoint B. The notation "R" is similarly used elsewhere herein to denote the "reverse path" from endpoint B back to endpoint A.

The "sessionid" field 602 is a key that uniquely identifies a given communication.

The "seq" field 604 identifies the sequence number of this packet within the given communication.

The "packet bitmap" field 606 provides a bitmap in which the value of a given bit i indicates whether the packet with sequence number i was lost (0) or received (1) by endpoint B.

The "s, u, v" fields 608 contain timestamps associated with the transmission and reception of the packet by the endpoints A and B, such as the respective $S_i$, $U_i$ and $V_i$ timestamps described in the above-cited U.S. patent application. The timestamps $S_i$, $U_i$ and $V_i$ denote the respective times at which endpoint A sent the packet, endpoint B received the packet, and endpoint B sent the packet back to endpoint A.

The "pathlen" field 610 denotes the number of routers on the path from endpoint A to endpoint B that recorded their IP address in the IP header of the packet. This field is also referred to herein as the FPATHLEN field.

The "truepathlen" field 612 denotes the actual length of the path from endpoint A to endpoint B, as opposed to the length as indicated by the pathlen field above. This field is also referred to herein as the TRUE_FPATHLEN field. The actual path length is determined based on the TTL field of the packet.

The "path" field 614 includes a sequence of IP addresses along the path from endpoint A to endpoint B, one for each router that recorded its IP address in the IP header of the packet. This field is also referred to herein as the FPATH field.

The RTP payload 506 may include one or more additional fields. An example of one possible additional field is an "other content" field that contains any other data to be transported, such as, for example, a voice or video sample.

It is to be appreciated that the particular packet formats described above are not requirements of the invention. Numerous other formats can be used. Moreover, certain of the packet fields noted above are not utilized in the illustrative embodiment.

As noted above, the network topology determination functionality of the system 100 is configured such that communications are exchanged between the endpoints 102 in a manner that generates information characterizing the network topology, such as information identifying routers and paths between routers. These communications in the illustrative embodiment include by way of example the above-described encapsulated RTP packets communicated between the endpoints A and B. A given such communication will be more specifically referred to herein as comprising one or more test packets. The term "probe" may also be used herein to refer to a communication.

An example algorithm will now be presented for determining network topology information using the above-described test packets. It is assumed without limitation that test packets sent from endpoint A to endpoint B and from endpoint B back to endpoint A have the IP record route option set, and the TTL field set to a fixed value denoted DEFAULT_TTL. Suitable example values include 64 or 255, although other values could be used.

Upon receipt of a test packet from endpoint A, endpoint B performs the following operations:

1. Extract information characterizing the forward path from A to B from the IP header of the received packet, writing the sequence of IP addresses into FPATH, and its length, corresponding to the number of addresses in FPATH, into FPATHLEN.

2. Extract the TTL field of the IP packet into a variable FTTL.

3. Compute TRUE_FPATHLEN=DEFAULT_TTL−FTTL.

4. Copy FPATHLEN, TRUE_FPATHLEN and PATH into an RTP packet to be sent back to endpoint A.

5. Send the packet with the rest of the RTP payload appropriately populated. The packet is sent encapsulated in UDP over IP as shown in FIG. 5.

Upon receipt of the echoed packet from endpoint B, endpoint A performs the following operations:

1. Retrieve the forward path length, the true forward path length, and the forward path as stored in the RTP payload into FPATHLEN, TRUE_FPATHLEN and FPATH, respectively.

2. Extract the path from B to A from the IP header of the received packet into RPATH, and its length into RPATHLEN.

3. Extract the TTL field from the IP header into a variable RTTL.

4. Compute TRUE_RPATHLEN=DEFAULT_TTL−RTTL.

5. Add the forward and reverse paths to a set denoted PATHS.

6. Add each router in the forward and reverse path to a list of known routers.

It should be noted that the [F/R]PATHLEN and TRUE_[F/R]PATHLEN variables in the illustrative embodiment help identify so-called "silent" routers, that is, routers that are present in a path but do not write their address into the record route space. This aspect of the invention will be described in greater detail below in conjunction with FIG. 9. Such silent routers are also referred to herein as cloud devices.

A distributed topology merging aspect of the invention will now be described with reference to FIGS. 7 and 8.

As indicated above, each router along a path writes the IP address of its outgoing interface into the record route space if the record route option is set. When packets are exchanged between multiple endpoint pairs, each accessible through a different interface of a router, several IP addresses may be obtained that belong to the same router. For example, addresses 1 and 2 in router 302-1 of FIG. 3 are obtained when a packet is sent from endpoint A to endpoint B and then echoed back from B to A.

The present invention provides a merging algorithm that identifies IP addresses belonging to the same router, and groups them into an equivalence class. Thus, the result of the merging process is a set of equivalence classes, one for each router in the topology.

The merging process may be described as follows in the context of the illustrative embodiment. When a message is sent from a source to a UDP destination, identified by an IP address and a port number, at which no process is listening, the destination sends back an Internet Control Message Protocol (ICMP) DESTINATION_UNREACHABLE error message with a code of PORT_UNREACHABLE, from the address of the outgoing interface for a unicast route to the source. The UDP message is also referred to herein as a UDP "probe."

Figure 7:
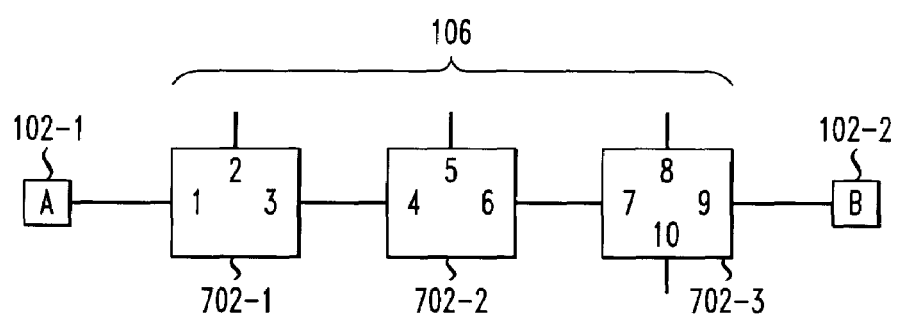
FIG. 7 illustrates the merging of router addresses in accordance with the invention.

Referring now to FIG. 7, an example is shown in which endpoints 102-1 and 102-2 communicate via routers 702-1, 702-2 and 702-3 of the network 106. The endpoints 102-1 and 102-2 are also denoted as endpoints A and B, respectively. The routers 702-1, 702-2 and 702-3 include sets of IP addresses {1, 2, 3}, {4, 5, 6} and {7, 8, 9, 10}, respectively.

In this example, if UDP probes are sent from endpoint A to addresses 4, 5, 6 and to a port number at which no process is likely to be listening, such as port number 9999, the above-noted ICMP error message would always be received from IP address 4, indicating that IP addresses 4, 5 and 6 belong to the same router.

It should be noted that certain routers may not behave in the manner noted above. However, for any such routers, it is believed that sending a packet with a specific TTL will cause the routers to behave in the desired manner.

FIG. 8 shows pseudocode for an exemplary implementation of a merging algorithm of the type described above. The algorithm may be executed by each of a plurality of endpoints in the system, since each endpoint has a different "view" of the network, and combining these different views provides improved topology information. Other types of algorithms may be used to merge IP addresses in determining network topology in accordance with the techniques of the present invention.

Additional details relating to TTL extraction for "silent" routers in the illustrative embodiment will now be described with reference to FIG. 9. As indicated previously, such silent routers are also referred to as cloud devices.

During topology determination using the record route option of the illustrative embodiment, some router addresses may be missing from the list of addresses obtained when a packet reaches its destination. For example, as noted above, the record route option as specified in IPv4 has a limitation of nine hops, attributable to the fixed header size, such that any router in the path of the packet beyond the nine-hop limit cannot identify itself in the IP packet header. As another example, some routers may be configured so as not to add their address in the packet, as is sometimes done by network administrators for security purposes. Both of these examples illustrate situations giving rise to silent routers.

The TTL extraction aspect of the invention can be used to determine the existence of these silent routers and also their exact position along the path. This information permits determination of a particularly accurate topology of the network to be analyzed.

Exemplary techniques will be described below for determining the existence of the silent routers and their positions along the path.

Figure 9:
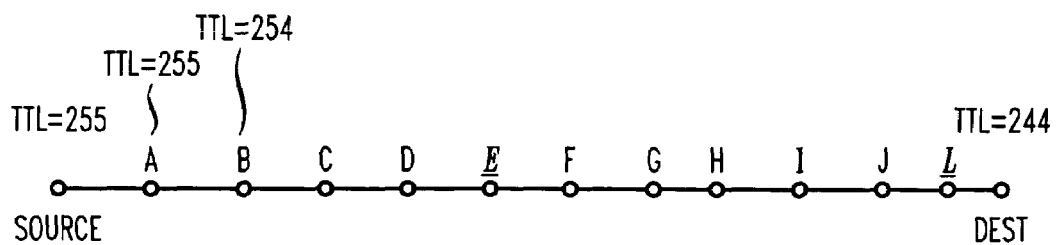
FIG. 9 illustrates Time To Live (TTL) extraction in accordance with the invention.

Referring now to FIG. 9, an example is shown involving a network comprising routers denoted A, B, C, D, E, F, G, H, I, J and L in a path from a source endpoint to a destination endpoint. The TTL field of a packet at the source is initially set to a default value of 255, and is subsequently decremented by each of the routers in the path, reaching a value of 244 when the packet reaches the destination. Use of IPv4 is assumed, such that the record route space is limited to a total of nine IP addresses.

The following two cases will be considered.

Case1: All routers between the source and destination record the route.

Case 2: Router E is configured not to record the route.

In Case 1, if a packet is sent from the source to the destination, it will have a record route of A, B, C, D, E, F, G, H, I. Note that the two remaining routers J and L cannot add their addresses to the record route information since the IP packet header has run out of record route space. However, if the TTL field is observed at the destination, it indicates exactly the number of hops the packet has passed through. It was noted above that the [F/R]PATHLEN and TRUE [F/R]PATHLEN variables in the illustrative embodiment help identify silent routers. More specifically, if the TTL-indicated hop count and the count of addresses seen on the IP header at the destination are different, one may conclude the number of silent routers in the path is given by the difference in the two counts.

In Case 2, assuming the same method of sending a packet from source to destination is employed, the recorded route is A, B, C, D, F, G, H, I, J. Note that routers E and L are missing addresses in the list. Again, the difference between the TTL-indicated hop count and the count of addresses seen in the IP packet header indicates the number of such silent routers in the network path from source to destination.

The following algorithm may be used to determine the position of a given silent router along the path. A series of probes with increasing TTL values may be sent to every observed node along the recorded route in succession. If a given TTL probe to any particular address does not result in a reply, or results in an ICMP TTL exceeded message, a determination is made that there is a silent router at the corresponding TTL-indicated hop.

By way of example, with reference again to Case 1, the first nine hop addresses are obtained. A probe may then be sent to router A with TTL=1. A reply is received. Then a probe is sent to router B with TTL=2, and a reply is received. Additional probes are sent in this manner with increasing TTL values until a probe with TTL=9 is sent. If all of these resulted in a reply, the silent routers are determined to be at the end of the path. The exact number of such routers would be the difference in the TTL-indicated hop count and the count of IP addresses obtained in the IP header. For Case 1, the count of these silent routers would be two.

In Case 2, the recorded address list of A, B, C, D, F, G, H, I, J is obtained. Note that router E is missing from the list because it is configured not to record its address and router L is missing from the list because there is room in the record route space only for nine hops. The recorded address list is therefore used as a signature and probes are sent out in the manner previously described. A probe with TTL=1 is sent to router A, and a reply is received. A probe sent to router B with TTL=2 yields a reply. Similarly, probes to routers C and D with TTL=3 and TTL=4, respectively, both yield replies. Then a probe to F with TTL=5 will result in an ICMP TTL exceeded message from E or no reply at all. This is due to the fact that the TTL needed to reach F is actually 6, and indicates that the location of the first silent router is immediately following router D in the path. Continuing along the path, a probe to F with TTL=6 yields a reply, a probe to G with TTL=7 yields a reply. Probes to H with TTL=8, to I with TTL=9 and to J with TTL=10 all yield replies. Since the routers for the first nine hops have now been determined, any remaining silent routers must be at the end of the path after router J. In Case 2, there is one silent router after J representing the router L.

The foregoing algorithm can be applied to a network that implements a load balancing process. In such an application, the actual recorded path is again used as a signature, but each time a probe is sent out in succession to an address in this signature, the probe is utilized to record yet another route that is compared with the signature route held for the entire path. The newly recorded route may be processed as a "substring" of the signature.

Although illustrated with reference to routers, the above TTL extraction techniques can be applied to other types of network elements, as will be readily appreciated by those skilled in the art.

A number of techniques suitable for use in processing the above-noted network topology information will now be described.

The network topology information in the illustrative embodiment generally comprises a set of nodes and a set of directed edges between those nodes. Such information may include one or more paths, where a path generally denotes a sequence of edges used to go from one node to another through one or more intermediate nodes.

An advantage of the network topology information collects in the illustrative embodiment is that it characterizes actual observed paths, as opposed to theoretical paths associated with the conventional SNMP-based approach.

The network topology information can be processed to show how the network is used for various subsets of the packets, corresponding to whatever restriction(s) may be of interest in a given application. By way of example, the subset of interest can reflect only those packets having certain traffic type restrictions, such as packets with a specific Type Of Service (TOS) setting, Differentiated Services Code Point (DSCP), or 802.1p/q setting, and path or performance restrictions, such as packets going to or coming from a specified set of routers or other network elements A, B or C in more than 100 milliseconds. Given the restriction, the nodes and/or edges of the network can be rendered on a graphical display using colors, thickness or other visual characteristics. Such an arrangement may reflect how frequently the nodes and/or edges were used relative to factors such as the size of the subset, to indicate how the network would be used under the proposed restrictions, or the total number of packets available, to indicate how frequently the network is used under the proposed restrictions.

Other more complex calculations can be made on the basis of the restricted set, including a determination of the path or load balancing process that would result in minimal transit time.

A visualization software tool providing one or more of the features described above preferably will not restrict the choice of calculation that is made but will instead permit user selection thereof via an appropriate interface, thus providing a platform for the calculation of network characteristics in general. The tool should also let the user specify how network characteristics are to be rendered. The tool is preferably able to operate either in an offline or non-real-time mode or in an on-line or real-time mode. In the latter mode, it may be configured to receive data from an external real-time source.

Although illustrated using communications between selected pairs of endpoints, the invention may be implemented so as to utilize other communication arrangements, including unary test communications involving only a single endpoint device, test communications involving more than two endpoint devices, or combinations of these and other types of communications.

As previously noted, one or more of the network topology determination functions described above in conjunction with the illustrative embodiment of the invention may be implemented in whole or in part in software utilizing processor 202 and memory 204 associated with a given endpoint device. Other suitable arrangements of hardware, firmware or software may be used to implement the monitoring and analysis functions of the invention.

It should again be emphasized the above-described embodiments are illustrative only. For example, alternative embodiments may utilize different endpoint device hardware, firmware or software configurations, different data formats for packets or other communications, different types of network traffic, and different communication protocols than those of the illustrative embodiments. In addition, although communications between a selected pair of endpoints are described in conjunction with the above examples, other arrangements are possible, such as communications with a single endpoint, between a given originating endpoint and multiple destination endpoints, etc. These and numerous other alternative embodiments within the scope of the following claims will be apparent to those skilled in the art.

What is claimed is:

1. A method for determining network topology information in a network-based communication system, the method comprising the steps of:

generating at least one communication between a selected pair of endpoint devices each associated with a network, wherein the communication comprises at least one packet or frame, the communication being sent from a first one of the endpoint devices to a second one of the endpoint devices and returned from the second endpoint device to the first endpoint device; and processing information contained in the communication as received at the first endpoint device from the second endpoint device to determine network topology information characterizing at least a portion of the network;

wherein the second endpoint device extracts forward path information from a header of the communication as received from the first endpoint device and inserts at least a portion of such extracted forward path information into a payload of the communication as returned to the first endpoint device; and wherein the information contained in the communication as received at the first endpoint device from the second endpoint device and processed to determine network topology information comprises:

forward path information contained in the payload of the communication as received at the first endpoint device from the second endpoint device, the forward path information comprising at least a forward path length and a true forward path length and one or more addresses of respective network elements in a forward path traversed by the communication from the first endpoint device to the second endpoint device; and reverse path information contained in the header of the communication as received at the first endpoint device from the second endpoint device, the reverse path information comprising at least a reverse path length and one or more addresses of respective network elements in a reverse path traversed by the communication from the second endpoint device to the first endpoint device.

2. The method of claim 1 wherein the network topology information comprises information characterizing nodes and edges of the network.

3. The method of claim 1 wherein the packet is transmitted with a record route option enabled.

4. The method of claim 1 wherein the packet is transmitted with a designated value in a Time To Live (TTL) field thereof.

5. The method of claim 1 wherein the packet comprises an Internet Protocol (IP) packet having encapsulated therein a Real-Time Transport Protocol (RTP) packet.

6. The method of claim 1 wherein the packet as received at the first endpoint device from the second endpoint device comprises a payload having a path field indicating a sequence of addresses along a path through the network from the first endpoint to the second endpoint, including one address for each network element in the path that recorded its address in a header of the packet as received at the second endpoint device from the first endpoint device.

7. The method of claim 1 wherein the packet as received at the first endpoint device from the second endpoint device comprises a payload having a path length field indicating a number of network elements in a path through the network that recorded their addresses in a header of the packet as received at the second endpoint device from the first endpoint device.

8. The method of claim 1 wherein the packet as received at the first endpoint device from the second endpoint device comprises a payload having a true path length field indicating a number of network elements in a path through the network as determined based at least in part on a Time To Live (TTL) field of the packet as received at the second endpoint device from the first endpoint device.

9. The method of claim 1 wherein upon receipt of the packet from the first endpoint, the second endpoint performs the following steps:

extracting from a header of the packet information characterizing a forward path from the first endpoint to the second endpoint;

extracting a Time To Live (TTL) value from a TTL field of the packet;

computing a true forward path length based on the extracted TTL value;

inserting the computed true forward path length and at least a portion of the information characterizing the forward path into a payload of the packet; and returning the packet to the first endpoint.

10. The method of claim 1 wherein upon receipt of the packet from the second endpoint, the first endpoint performs the following steps:

extracting from a payload of the packet a computed true forward path length and information characterizing a forward path from the first endpoint to the second endpoint;

extracting from a header of the packet information characterizing a reverse path from the second endpoint to the first endpoint;

extracting a Time To Live (TTL) value from a TTL field of the packet;

computing a true reverse path length based on the extracted TTL value; and determining the network topology information based at least in part on the computed true forward and reverse path lengths, the information characterizing the forward path and the information characterizing the reverse path.

11. The method of claim 1 further including the step of executing a merging algorithm that identifies in the network topology information addresses belonging to the same network element, and groups the identified addresses into an equivalence class, such that a set of equivalence classes is formed including one class for each of a plurality of network elements of the network.

12. The method of claim 1 further including the step of identifying in the network topology information any network element that is unable to enter its address into a record route space of the packet.

13. The method of claim 12 wherein a given network element that is unable to enter its address into a record route space of the packet is identified by sending probes with incrementally increasing Time To Live (TTL) values to previously identified network elements along a path from one of the endpoints to the other endpoint.

14. The method of claim 1 wherein one or more of the endpoints are each configured so as to be prevented from inserting a corresponding endpoint address into a record route space of the packet.

15. The method of claim 1 wherein the network topology information characterizing at least a portion of the network comprises information characterizing a load balancing process of the network.

16. The method of claim 1 wherein the network topology information characterizing at least a portion of the network comprises information utilizable in a distributed monitoring and analysis system for network traffic.

17. The method of claim 1 wherein at least one of the endpoint devices comprises a terminal node of the network.

18. The method of claim 1 wherein at least one of the endpoint devices comprises an internal node of the network.

19. An apparatus for use in determining network topology information in a network-based communication system, the apparatus comprising:

a first endpoint device having a processor coupled to a memory;

the first endpoint device being connectable to a network, the network having at least a second endpoint device also connectable thereto;

the first endpoint device being operative to generate at least one communication that is sent from the first endpoint device to the second endpoint device and returned from the second endpoint device to the first endpoint device, over the network, wherein the communication comprises at least one packet or frame; and the first endpoint device being further operative to process information contained in the communication as received at the first endpoint device from the second endpoint device to determine network topology information characterizing at least a portion of the network;

wherein the second endpoint device extracts forward path information from a header of the communication as received from the first endpoint device and inserts at least a portion of such extracted forward path information into a payload of the communication as returned to the first endpoint device; and wherein the information contained in the communication as received at the first endpoint device from the second endpoint device and processed to determine network topology information comprises:

forward path information contained in the payload of the communication as received at the first endpoint device from the second endpoint device, the forward path information comprising at least a forward path length and a true forward path length and one or more addresses of respective network elements in a forward path traversed by the communication from the first endpoint device to the second endpoint device; and reverse path information contained in the header of the communication as received at the first endpoint device from the second endpoint device, the reverse path information comprising at least a reverse path length and one or more addresses of respective network elements in a reverse path traversed by the communication from the second endpoint device to the first endpoint device.

20. An article of manufacture comprising a machine-readable storage medium containing software code for use in determining network topology information in a network-based communication system, wherein the software code when executed implements the steps of:

generating at least one communication between a selected pair of endpoint devices each associated with a network, wherein the communication comprises at least one packet or frame, the communication being sent from a first one of the endpoint devices to a second one of the endpoint devices and returned from the second endpoint device to the first endpoint device; and processing information contained in the communication as received at the first endpoint device from the second endpoint device to determine network topology information characterizing at least a portion of the network;

wherein the second endpoint device extracts forward path information from a header of the communication as received from the first endpoint device and inserts at least a portion of such extracted forward path information into a payload of the communication as returned to the first endpoint device; and wherein the information contained in the communication as received at the first endpoint device from the second endpoint device and processed to determine network topology information comprises:

forward path information contained in the payload of the communication as received at the first endpoint device from the second endpoint device, the forward path information comprising at least a forward path length and a true forward path length and one or more addresses of respective network elements in a forward path traversed by the communication from the first endpoint device to the second endpoint device; and reverse path information contained in the header of the communication as received at the first endpoint device from the second endpoint device, the reverse path information comprising at least a reverse path length and one or more addresses of respective network elements in a reverse path traversed by the communication from the second endpoint device to the first endpoint device.

* * * * *

UNITED STATES PATENT AND TRADEMARK OFFICE
CERTIFICATE OF CORRECTION

| | | |
|---|---|---|
| PATENT NO. | : 7,602,728 B2 | Page 1 of 1 |
| APPLICATION NO. | : 10/460700 | |
| DATED | : October 13, 2009 | |
| INVENTOR(S) | : Adhikari et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1588 days.

Signed and Sealed this

Fifth Day of October, 2010

David J. Kappos
*Director of the United States Patent and Trademark Office*